United States Patent [19]

Nonomura

[11] Patent Number: 5,194,967
[45] Date of Patent: Mar. 16, 1993

[54] COMMUNICATION MANAGING DATA PROCESSING DEVICE IN FACSIMILE MACHINE

[75] Inventor: Yutaka Nonomura, Iwakura, Japan
[73] Assignee: Brother Kogyo Kabushiki Kaisha, Aichi, Japan
[21] Appl. No.: 554,871
[22] Filed: Jul. 20, 1990
[30] Foreign Application Priority Data

Jul. 21, 1989 [JP] Japan .................. 1-187569

[51] Int. Cl.⁵ .................................. H04N 1/00
[52] U.S. Cl. ............................ 358/434; 358/437; 358/438; 358/468
[58] Field of Search ............... 358/402, 404, 434, 437, 358/438, 440, 444, 468

[56] References Cited

U.S. PATENT DOCUMENTS

| 4,432,020 | 2/1984 | Onose et al. | 358/434 |
| 4,646,160 | 2/1987 | Iizuka et al. | 358/402 |
| 4,878,123 | 10/1989 | Miura et al. | 358/404 |
| 5,038,226 | 8/1991 | Nagaishi | 358/404 |

FOREIGN PATENT DOCUMENTS

| 0053914 | 4/1979 | Japan | 358/434 |
| 0147716 | 11/1979 | Japan | 358/437 |
| 0046362 | 4/1981 | Japan | 358/438 |
| 0014653 | 1/1983 | Japan | 358/434 |
| 0225672 | 12/1984 | Japan | 358/440 |

Primary Examiner—Jin F. Ng
Assistant Examiner—Nina Tong
Attorney, Agent, or Firm—Oliff & Berridge

[57] ABSTRACT

A facsimile communication managing data including transmission/reception mode, a telephone number of a called or a calling subscriber, etc. is printed out at a predetermined time interval. Each time a facsimile communication is made, the facsimile communication managing data is stored in a memory. A period of time defining a time interval at which the stored managing data are read out is set through a keyboard. An elapse of the period of time is detected and a detection signal is issued. If the detection signal is output during a non-busy state of the facsimile machine, the managing data are read out of the memory immediately after the occurrence of the detection signal and then printed in a printing station of the facsimile machine, whereas if the detection signal is output during a busy state of the facsimile machine, the managing data are read out after the facsimile machine is turned to the non-busy state and printed in the printing station thereof.

7 Claims, 2 Drawing Sheets

5,194,967

COMMUNICATION MANAGING DATA PROCESSING DEVICE IN FACSIMILE MACHINE

BACKGROUND OF THE INVENTION

The present invention relates to a communication managing data processing device for use in combination with a facsimile machine.

For managing facsimile communications, typical facsimile machines have storage devices for storing therein communication managing data including data regarding year-month-date/time at which the facsimile communication was made, transmission/reception mode, name of calling or called subscriber, sheet numbers transmitted from or received at the facsimile machine, transmission/reception failure data and the like. Such communication managing data are stored in the storage device whenever a facsimile communication is performed. Reading of the communication managing data is typically performed in such a way that with a key switch provided in an operation panel or a keyboard of the facsimile, up-to-date communication managing data which have been stored in the storage device are sequentially read out and printed at a printing station of the facsimile in response to the depression of the key switch, thereby providing a facsimile communication managing record. Alternatively, the communication managing data is automatically read out of the storage device and printed out when the storage device is filled with the managing data.

According to the former, the managing record covers the up-to-date communication managing data which have been stored after the previous readout of the communication managing data. However, since the interval between the key switch depressions is not fixed, a large quantity of the storage device is required so as to cover a possible largest number of facsimile communications which may be performed before the depression of the key switch.

According to the latter, while a lesser quantity of the storage device may suffice, there will be variation in time interval at which the communication managing records are provided. Specifically, the interval between readings of the communication managing data is shortened if a large number of facsimile communications are performed within a prescribed period of time whereas the interval therebetween is prolonged if a small number of facsimile communications are performed within a prescribed period of time. Due to a difficulty in predicting the time when the communication managing record is printed out, it is inconvenient to manage the facsimile communications with the managing record. In the worst situation, the managing record may be printed out during the facsimile communication, with the result that the managing record is mixed up with the sheets received through the facsimile communication. There may a possibility that the managing record is inadvertently lost.

SUMMARY OF THE INVENTION

The present invention has been made in view of the foregoing, and it is an object of the invention to provide a facsimile communication managing data processing device for use in combination with a facsimile machine, in which the time when the managing data is output is set in advance and up-to-date managing data is output at every predetermined interval.

To achieve the above and other objects, there is provided a communication managing data processing device for use in combination with a facsimile machine as shown in FIG. 1, which comprises storage means 1 for storing facsimile communication managing data whenever a facsimile communication is made, setting means 2 for setting a period of time defining a time interval at which the facsimile communication managing data having been stored in the storage means 1 is output, detection means 3 for detecting an elapse of the period of time set by the setting means 2 and outputting a detection signal indicative of the elapse of the period of time, and readout instructing means 4 for instructing to read the facsimile communication managing data out of the storage means 1. If the detection signal is output during a non-busy state of the facsimile machine, the facsimile communication managing data is read out thereof immediately after the occurrence of the detection signal and if the detection signal is output during a busy state of the facsimile machine, the facsimile communication managing data is read out thereof after the facsimile machine is turned to the non-busy state. The facsimile communication managing data thus read out is printed out by printing means 5 provided in the facsimile machine.

According to the device thus arranged, the facsimile communication managing data are stored in the storage means 1 each time the facsimile communication is performed, and read out thereof in response to an instruction issued from the readout instruction means 4. When the detection signal is received from the detection means 3 during the non-busy state of the facsimile machine, the readout instruction means 4 issues the instruction immediately after the detection signal is received. On the other hand, when the detection signal is received from the detection means 3 during the busy state of the facsimile machine, the readout instruction mean 4 issues the instruction after the facsimile machine is turned to the non-busy state. In this manner, the managing data are read out at the interval substantially equal to that set through the setting means 2 and then printed out in the printing means 5 to provide a facsimile communication managing record.

With the device according to the present invention, prediction can be made with respect to the time when the facsimile communication managing record is provided, and therefore the management of the facsimile communications can be facilitated.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
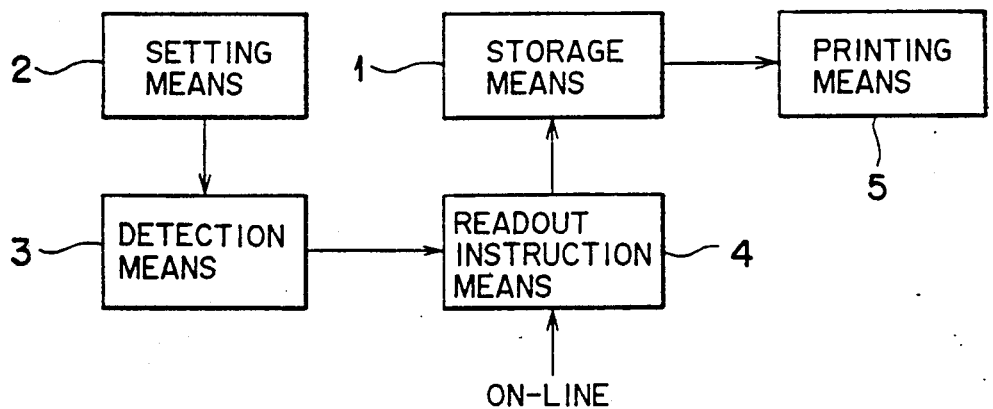
FIG. 1 is a block diagram illustrative of an arrangement of a facsimile communication managing data processing device according to the present invention.
Figure 2:
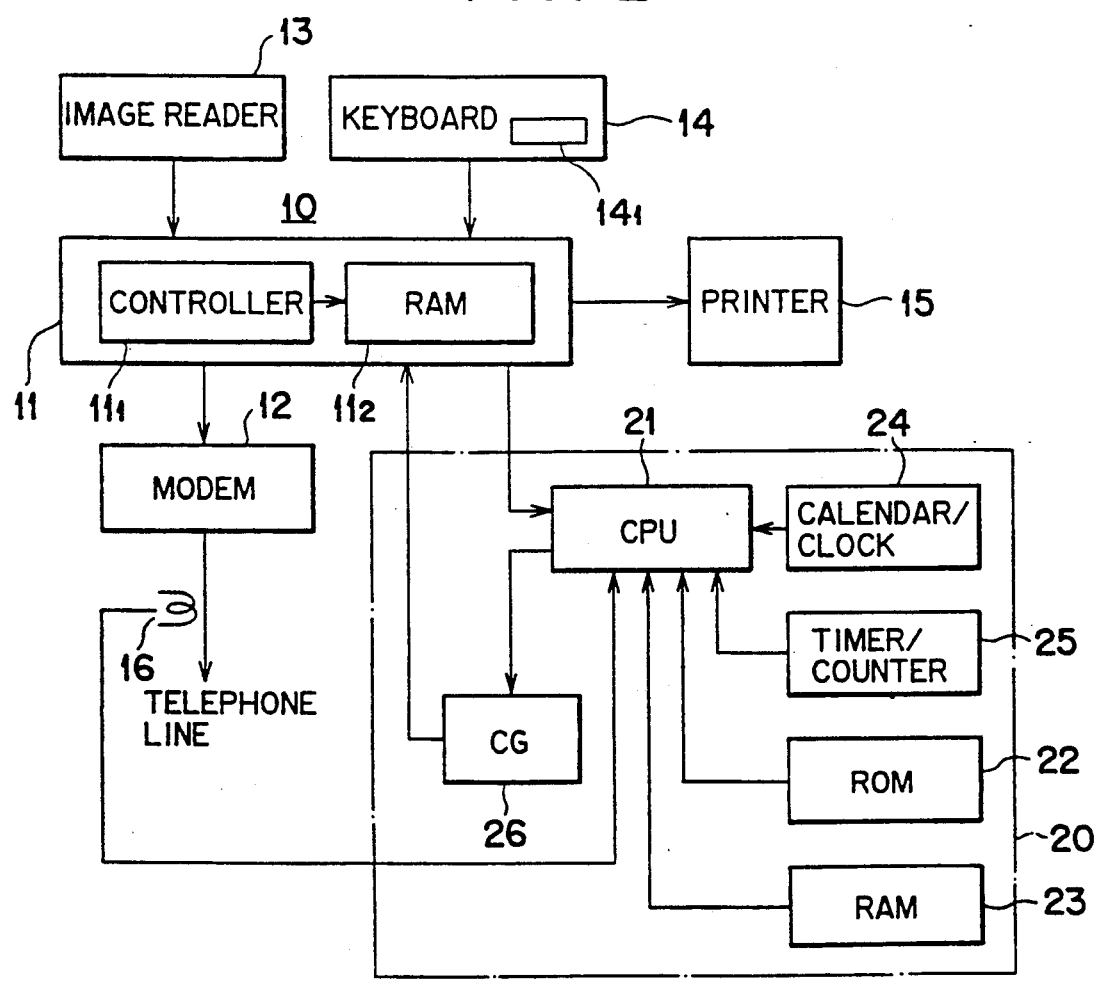
FIG. 2 is a block diagram illustrative of one embodiment of the present invention.

A facsimile machine according to a preferred embodiment of the present invention is arranged as shown in FIG. 2 which includes a control section 11, a modulator/demodulator (hereinafter referred to as "MODEM") 12, an image reader 13, an operation panel 14 and a printer 15.

The image reader 3 reads an image to be transmitted and sends the binary coded image signal to the control section 11 which in turn sends the image signal to the MODEM 12 upon storing it in a random access memory (RAM) $11_2$. The MODEM 12 modulates the image signal and sends it to a called subscriber at a remote point through a telephone line. In the reception mode of the facsimile, the MODEM 12 demodulates incoming image signal received through the telephone line from the remote calling subscriber.

The operation keyboard 14 is provided with a dial key and other keys including a time interval specifying key $14_1$ for specifying an output time interval of communication managing data. The printer 15 used herein is of a thermal type.

A detection coil 16 is provided for detecting data regarding called or calling subscriber's telephone number out of signals transmitted from or received at the facsimile through the telephone line.

The control section 11 includes a controller $11_1$ and the RAM $11_2$. The controller $11_1$ controls both transmission of the outgoing signals and reception of the incoming signals in accordance with a predetermined transmission/reception sequence complying with a CCITT (Consultative Committee in International Telegraphy and Telephony) recommendation. The RAM $11_2$ stores the binary coded image data output from the image reader 3 at the time of data transmission, and also stores the incoming data being demodulated in the MODEM 12 at the time of data reception.

At the time of data transmission, the image data is read out of the RAM $11_2$ and is subjected to data compression, and is then modulated in the MODEM 12. On the other hand, at the time of data reception, the incoming image data is demodulated in the MODEM 12 and is stored in the RAM $11_2$. One line image data is sequentially read out of the RAM $11_2$ and is supplied to the printer 15.

A communication managing data producing section 20 includes a central processing unit (CPU) 21, a read-only memory (ROM) 22 storing a program for executing the CPU 21, a random access memory (RAM) 23 storing communication managing data and other necessary data, a calendar/clock circuit 24 for outputting year-month-date/time data, a timer/counter 25 in which is set a time interval specified by the key $14_1$ on the operational keyboard 14, and a character generator (CG) 26. In response to depression of the time interval specifying key $14_1$ and a time interval specified by the ten-key on the operational keyboard 14, the CPU 21 sets the output time interval in the timer/counter 25. The CPU 21 receives telephone number data and transmission/reception mode both detected and fed from the detection coil 16, and year-month-date/time data fed from the calendar/clock circuit 24, and stores such data in the RAM 23.

Transmitting/receiving sheet number data, transmission/reception failure data are further stored in the RAM 23 by the CPU 11. In response to end of transmission/reception data, the CPU 11 reads the recorded data out of the RAM 23 and develops the recorded data into dot data while interacting with the character generator 26 to allow the printer 15 to print the communication managing data.

Figure 3:
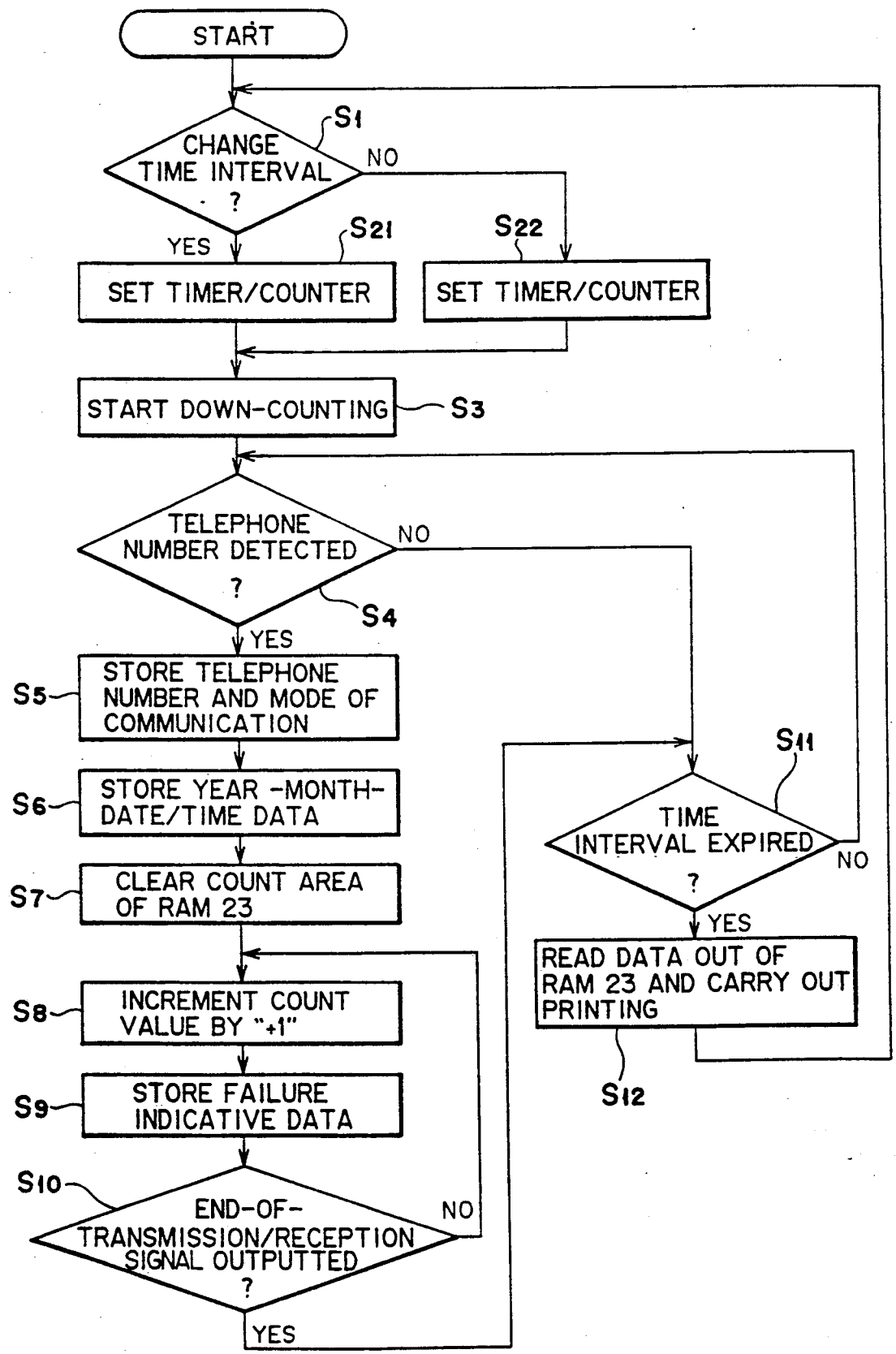
FIG. 3 is a flow chart for description of the operation of the embodiment shown in FIG. 2.

Operation of the apparatus thus constructed will be described with reference to the flow chart illustrated in FIG. 3.

Upon start of a communication managing data program, it is firstly checked whether a change of the time interval has been effected based on whether the time interval specifying key $14_1$ is depressed and the input of a new time interval is effected through the ten-key (step S1). If YES, the new time interval as input is set to the timer/counter 25, and the time interval data which has been stored in a time interval data storage area of RAM 23 is updated (step S21). When the decision made in step S1 is NO, the time interval data which has been stored in the storage area of the RAM 25 is set as it is to the timer/counter 25 (step S22). After the processings in steps S21 and S22 are completed, the timer/counter 25 starts down-counting (step S3).

In step S4, it is checked whether a calling or called subscriber's telephone number has been detected through the detection coil 16. If NO, it is checked whether the time interval set in the timer/counter 25 has expired (step 11). If NO, the routine returns to step S4 and the processing therein is repeatedly carried out until the telephone number is detected. When either the calling or called subscriber's telephone number is detected in step S4, this subscriber's telephone number data is stored in a telephone number storage area of the RAM 23, and transmission/reception data supplied to the CPU 21 from the controller 11 is stored in a transmission/reception data storage area of the RAM 25 (step S5). Year-month-date/time data is next stored in a time data storage area of the RAM 25 (step S6).

A count area formed in the RAM 25 is cleared in step S7 and a count number is incrementally written therein in response to a document-number identifying signal outputted whenever a sheet of a document is read out in a transmission mode or received whenever one page data is received in a reception mode. In step S9, failure indicative data indicating failure of transmission/reception is stored in a failure data storage area of the RAM 25 in the event that a failure of data transmission or reception has occurred. Following step S9, it is checked whether or not an end-of-transmission/reception signal is output (step 10). Until the end-of-transmission/reception signal is output, the processings in steps S8 and S9 are repeatedly carried out. Accordingly, the data stored in the count area indicates the number of sheets transmitted in the transmission mode or received in the reception mode. When there is a failure during transmission or reception, failure indicative data is stored in the failure data storage area. Both the sheet number data and the failure indicative data are supplied from the control section 11 to the CPU 21.

When a decision is made in step S10 so that the end-of-transmission/reception signal has been output, it is further checked in step S11 whether or not the time interval has been expired. If NO, the routine returns to S4 and the processing therein is again executed.

When a decision made in step S11 indicates that the time interval has expired, the telephone number data, transmission/reception mode data, year-month-date/time data, sheet-number data, and failure indicative data are read out of the corresponding storage areas of the RAM 23. In response to the data thus read out, characters in the character generator 26 are specified. First dot line of the dots forming a specified character string is sequentially developed in the RAM $11_2$ on dot line basis and is supplied to the printer 15 with which the character strings corresponding to the data read out of the RAM 23 are printed.

In printing data, character-to-character spacing, columnar spacing between different kinds of data, and line spacing between adjacent character lines are filled with space dots as is well known in the art.

Although the present invention has been described with reference to a specific embodiment of the present invention, it should be understood for a person skilled in the art that a variety of changes and modifications may be made without departing from the scope and spirit of the invention. For example, in lieu of the failure indicative data representative of an error occurring during the facsimile communication, no-error data representing that no error has been occurred may be employed.

What is claimed is:

1. A communication managing data processing device for use in combination with a facsimile machine, comprising:

storage means for storing facsimile communication managing data whenever a facsimile communication is made;

setting means for setting a period of time defining an interval at which the facsimile communication managing data stored in said storage means is output;

detection means for detecting an elapse of the period of time set by said setting means and outputting a detection signal indicative of the elapse of the period of time; and readout instructing means for instructing to read the facsimile communication managing data out of said storage means, wherein if the detection signal is output during a non-busy state of the facsimile machine, the facsimile communication managing data is read out thereof immediately after the occurrence of the detection signal and if the detection signal is output during a busy state of the facsimile machine, the facsimile communication managing data is read out thereof after the facsimile machine is turned to the non-busy state.

2. A device according to claim 1, wherein the time interval set by said setting means is further stored in said storage means.

3. A device according to claim 2, wherein the time interval stored in said storage means is updated when a time interval is newly set by said setting means.

4. A device according to claim 2, wherein the facsimile communication managing data is read out of said storage means at a time interval stored in said storage means unless a time interval is newly set by said setting means.

5. A device according to claim 1, wherein said detection means comprises a timer/counter in which the period of time set by said setting means is set, said timer/counter effecting down-counting and outputting the detection signal when said timer/counter indicates the elapse of the period of time as a result of down-counting.

6. A device according to claim 1, wherein the facsimile communication managing data includes a telephone number of at least one of a calling and called subscriber, a transmission/reception mode, a transmitting/receiving sheet number, transmission/reception failure data representative of errors occurring during transmission and reception, and year-month-date/time data representative of year, month, date and time when the facsimile communication is made.

7. A device according to claim 6, further comprising a calendar/clock circuit for producing the year-month-date/time data.

* * * * *